(12) United States Patent  
Nicholson et al.

(10) Patent No.: US 8,345,558 B2
(45) Date of Patent: Jan. 1, 2013

(54) PACKET-BASED MEMORY TEST OF A NETWORK DEVICE

(75) Inventors: Mark Nicholson, San Mateo, CA (US); Dhairyashil Patil, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 376 days.

(21) Appl. No.: 12/698,704

(22) Filed: Feb. 2, 2010

(65) Prior Publication Data

US 2011/0188386 A1    Aug. 4, 2011

(51) Int. Cl.
*H04L 12/26* (2006.01)
(52) U.S. Cl. .................... 370/242; 370/429
(58) Field of Classification Search ............. 370/242, 370/249, 252, 351, 389, 412, 417, 428, 429; 324/200, 210, 211; 714/699, 718
See application file for complete search history.

(56) References Cited

U.S. PATENT DOCUMENTS

| 6,782,503 | B1 * | 8/2004 | Dawson | 714/739 |
| 6,928,593 | B1 * | 8/2005 | Halbert et al. | 714/718 |
| 2008/0025225 | A1 * | 1/2008 | Kanno | 370/241 |
| 2008/0123654 | A1 * | 5/2008 | Tse-Au | 370/392 |
| 2009/0265592 | A1 * | 10/2009 | Wu et al. | 714/718 |

* cited by examiner

*Primary Examiner* — Obaidul Huq
(74) *Attorney, Agent, or Firm* — Harrity & Harrity, LLP (57) ABSTRACT

A router may be tested using a packet-based testing technique in which the test packets are generated by the router. In one implementation, a forwarding plane in a router may include a first component to process header information of packets to determine forwarding information, and a memory component to store payload data for the packets. A control plane of the router may generate test packets, insert the test packets into the forwarding plane, receive a second set of packets from the forwarding plane, analyze the second set of packets to determine whether the second set of packets correspond to the inserted plurality of test packets, and output, based on the analysis, test results, relating to the operation of the routing device.

24 Claims, 7 Drawing Sheets

PACKET-BASED MEMORY TEST OF A NETWORK DEVICE

BACKGROUND

Computing and communication networks typically include devices, such as routers, switches or gateways, which transfer or switch data, such as packets, from one or more sources to one or more destinations. A network switch or router, in particular, may include a networking device that connects network segments and computing devices.

The size and capacity of a particular router may vary considerably depending on the intended application of the router. For example, routers may provide connectivity inside enterprises, between enterprises and the Internet, and inside Internet Service Providers (ISPs). The largest routers may interconnect ISPs, may be used inside ISPs, or may be used in very large enterprise networks. The smallest routers may provide connectivity for small businesses and/or home offices.

Routers may include memory that is used to store packets as the packets are being processed by the router. During manufacture of the router, it may be desirable to test the operation of the router, including the memory in the router, to ensure the memory is free of defects. Memory controllers in the router may include test circuits designed to test a low-level integrity of the memory. Some memory-related errors, however, may not be detectable by simply testing the integrity of each individual memory location. Dedicated router testing devices ("router testers") can be plugged into the input port(s) of the router. Router testers may provide a stream of test packets to the router so that the router may be tested in a simulated run-time environment. Memory testing procedures based on the use of router testers may find memory-related errors that may not be detectable using the low-level memory testing circuits of the memory controllers.

Exhaustively testing all the ports of a router using router testers, however, can be a prohibitively time consuming and expensive effort for a router manufacturer.

SUMMARY

In one implementation, a method for testing memory components of a router may include generating test packets and inserting the test packets into a forwarding plane of the router, the forwarding plane being configured in a loop-back configuration. The method may further include circulating the test packets in the forwarding plane, the circulation of the test packets including storing at least a portion of the test packets in the memory components. The method may further include receiving a second set of packets from the forwarding plane; analyzing the second set of packets to determine whether the second set of packets correspond to the inserted test packets; analyzing low-level memory test results received from a memory controller of the memory components; and outputting, based on the analysis of the second plurality of packets and the low-level memory test results, results of the testing of the memory components of the router.

In another implementation, a routing device may include a forwarding plane and a control plane. The forwarding plane may include a first component to process header information of packets to determine forwarding information based on the processing of the header information, and a memory component to store payload data for the packets. The control plane may generate test packets, insert the test packets into the forwarding plane, receive a second set of packets from the forwarding plane, analyze the second set of packets to determine whether the second set of packets correspond to the inserted plurality of test packets, and output, based on the analysis, test results, relating to the operation of the memory component, from the routing device.

In yet another implementation, a router may include a set of input ports to receive packets; a set of output ports to transmit packets; one or more first components to process header information of the packets to determine output ports of the set of output ports for the packets; memories to store payload data corresponding to packets being processed by the one or more first components, where the set of input ports and the set of output ports are connected in a loop-back configuration. The router may additionally include a test component to insert test packets into a processing path of the router that includes the one or more first components and the memories; read the test packets from the processing path of the router that includes the one or more first components and the memories; analyze the read test packets to determine whether the read test packets correspond to the inserted test packets; and output, based on the analysis, whether one or more of the memories are defective.

In yet another implementation, a router may include means for generating a plurality of test packets; means for inserting the plurality of test packets into a forwarding plane of the router, the forwarding plane being configured in a loop-back configuration; means for circulating the plurality of test packets in the forwarding plane of the router; means for receiving a second plurality of packets from the forwarding plane; means for analyzing the second plurality of packets to determine whether the second plurality of packets correspond to the inserted plurality of test packets; means for analyzing low-level memory test results received from a memory controller of the memory components; and means for outputting, based on the analysis of the second plurality of packets and the low-level memory test results, results of the testing of the memory components of the router.

BRIEF DESCRIPTION OF THE DRAWINGS

The accompanying drawings, which are incorporated in and constitute a part of this specification, illustrate one or more implementations described here and, together with the description, explain these implementations. In the drawings.

DETAILED DESCRIPTION

The following detailed description refers to the accompanying drawings. The same reference numbers in different drawings may identify the same or similar elements. Also, the following detailed description does not limit the invention.

A testing technique is described to test the memory and a data path associated with the memory, such as the data path in a router. The testing technique may test for memory errors or other errors, such as errors in a memory controller, that may occur in the forwarding plane of the router. Test packets may be generated in the control plane of the router and injected into the forwarding plane. The rate and data pattern of the test packets may be designed to place portions of the router under "stress," which may lead to an increased ability to detect manufacturing errors in the forwarding plane.

Exemplary Router Overview

Figure 1:
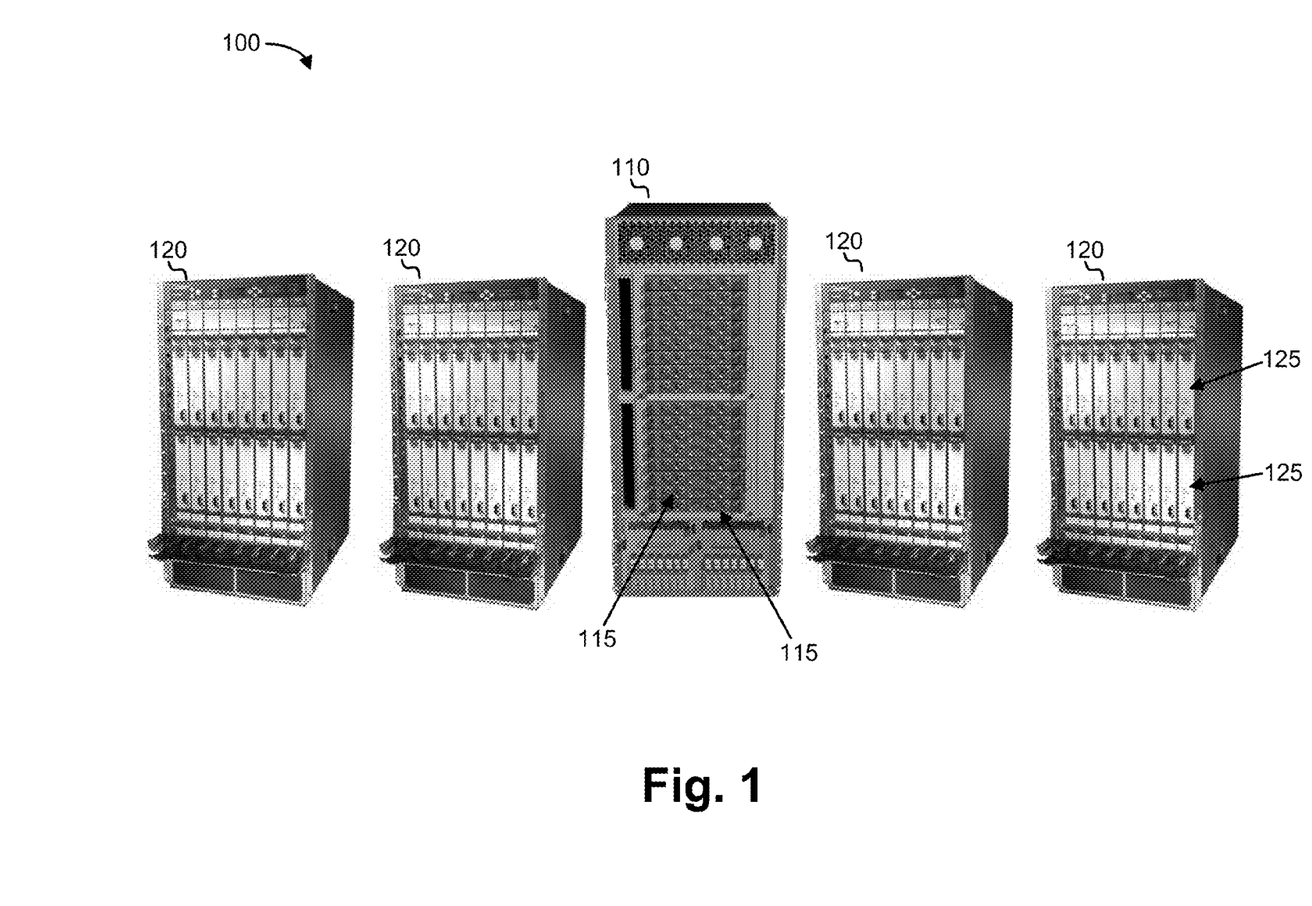
FIG. 1 is a diagram of an exemplary router for which concepts described herein may be implemented.

FIG. 1 is a diagram of an exemplary router 100 for which concepts described herein may be implemented. Router 100 may include a number of modular components. As particularly shown, router 100 may include a switch fabric chassis (SFC) 110 and one or more line card chasses (LCCs) 120. SFC 110 and LCCs 120 may be connected to one another, such as through optical or coaxial cabling, to form a single virtual router. In one particular implementation, SFC 110 may serve as a central switch fabric through which LCCs 120 connect. In other words, each LCC 120 may connect to SFC 110 and data units transmitted between LCCs 120 may go through SFC 110.

SFC 110, as previously mentioned, may act as a fabric switch through which LCCs 120 communicate. SFC 110 may include slots for switch interface boards (SIBs) 115 that may be plugged into SFC 110. SIBs 115 may be interface boards that implement the logic of the fabric switch. A user configurable number of SIBs 115 may be inserted into SFC 110.

Each LCC 120 may include one or more line cards, such as line cards 125, which may be inserted into LCC 120. Each line card 125 may connect LCC 120 to input/output links that connect router 100 to one or more external networks or devices. Different line cards 125 may be inserted into an LCC 120 to provide an interface to different transmission media, such as copper wire or optical fibers. Each LCC 120 may also include one or more packet forwarding engines (PFEs), which may implement the "intelligence" of router 100. The PFEs may, in general, examine header information of incoming packets, make routing decisions based on the header information, and forward the packets to an appropriate output port (possibly including an output port on another LCC 120) based on the routing decision.

In the exemplary router 100 shown in FIG. 1, one SFC 110 and four LCCs 120 are shown. In other implementations, router 100 may include additional components, fewer components, different components, or differently arranged components. More specifically, router 100 may be designed as a modular router in which users can add additional SFCs 110 or LCCs 120 as needed. In one implementation, a "full" configuration of router 100 may include up to five SFCs 110 and sixteen LCCs 120. Each SFC 110 or LCC 120 can also include a user configurable number of SIBs 115 or line cards 125, respectively.

Although a large, scalable router, including one with separate chassis is shown in FIG. 1, in alternative implementations, router 100 could be implemented in other forms. For example, router 100 may be implemented within a single card, physical case, or semiconductor chip. In general, the concepts described herein may be used with any router that includes a data forwarding plane that includes memory that stores data during the operation of the forwarding plane.

Figure 2:
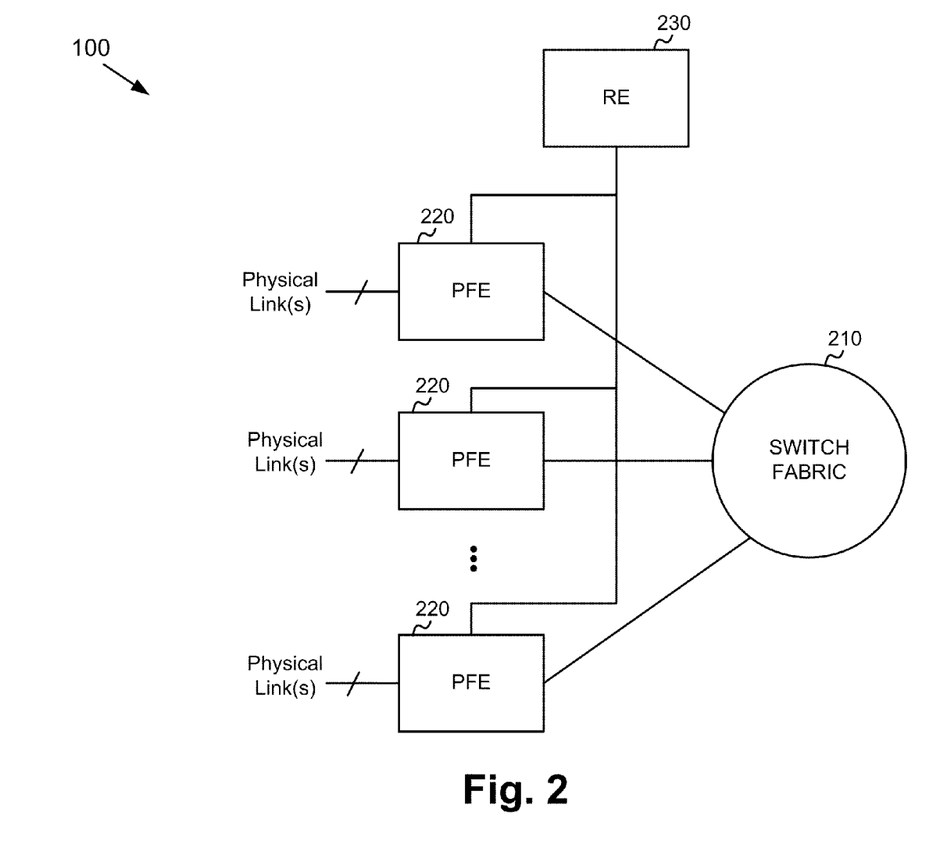
FIG. 2 is a block diagram illustrating a logical configuration of a router.

FIG. 2 is a block diagram illustrating a logical configuration of router 100. Router 100 may receive data streams, at line cards 125, from physical links, process the data streams to determine destination information, and transmit the data streams out on links in accordance with the destination information. As shown in FIG. 2, router 100 may include packet forwarding engines (PFEs) 220, a switch fabric 210, and a routing engine (RE) 230. PFEs 220 may be implemented in line cards 125 in one or more LCCs 120. Switch fabric 210 may be implemented by SIBs 115 in one or more SFCs 110. RE 230, although shown as a single component in FIG. 2, may be implemented in a distributed manner at one or more LCCs 120, such as distributed over multiple line cards 125. In routers that do not include LCCs or SFCs, the components shown in FIG. 2 may be physically implemented with a single chassis, card, or chip.

PFEs 220 may each be connected to RE 230 and switch fabric 210. PFEs 220 may receive packets at ports on physical links connected to a network, such as a wide area network (WAN) or a local area network (LAN). Each physical link could be one of many types of transport media, such as optical fiber or Ethernet cable. The data on the physical link may be formatted according to one of several protocols, such as the synchronous optical network (SONET) standard or Ethernet.

PFEs 220 may, for each received packet, process a header of the packet to determine an appropriate output port, at either the current PFE 220 or another PFE 220, for the packet. PFEs 220 may modify the header of the received packet before transmitting the packet to the determined output port. Some received packets may be forwarded to an output port connected to the PFE at which the packet arrived. Other packets may be forwarded, via switch fabric 210, to other PFEs 220 in router 100 for transmission at the determined output port. In the context of router 100, as illustrated in FIG. 1, each line card 125 may include one or more PFEs 220.

Switch fabric 210 may be a switching component designed to allow efficient communication between PFEs 220. For instance, switch fabric 210 may be a hardwired non-blocking minimal spanning switch capable of connecting N inputs to N outputs in any combination, such as a switch fabric implemented by SFC 110.

RE 230 may perform high level management functions for router 100. For example, RE 230 may communicate with other networks and network devices connected to router 100 to exchange information regarding network topology. RE 230 may create routing tables based on network topology information and forwarding tables based on the routing tables. The forwarding tables may be used by PFEs 220 to perform route lookup for incoming data units. RE 230 may also perform other general control and monitoring functions for router 100. In the context of router 100, as illustrated in FIG. 1, RE 230 may be implemented in a distributed manner on line cards 125.

Figure 3:
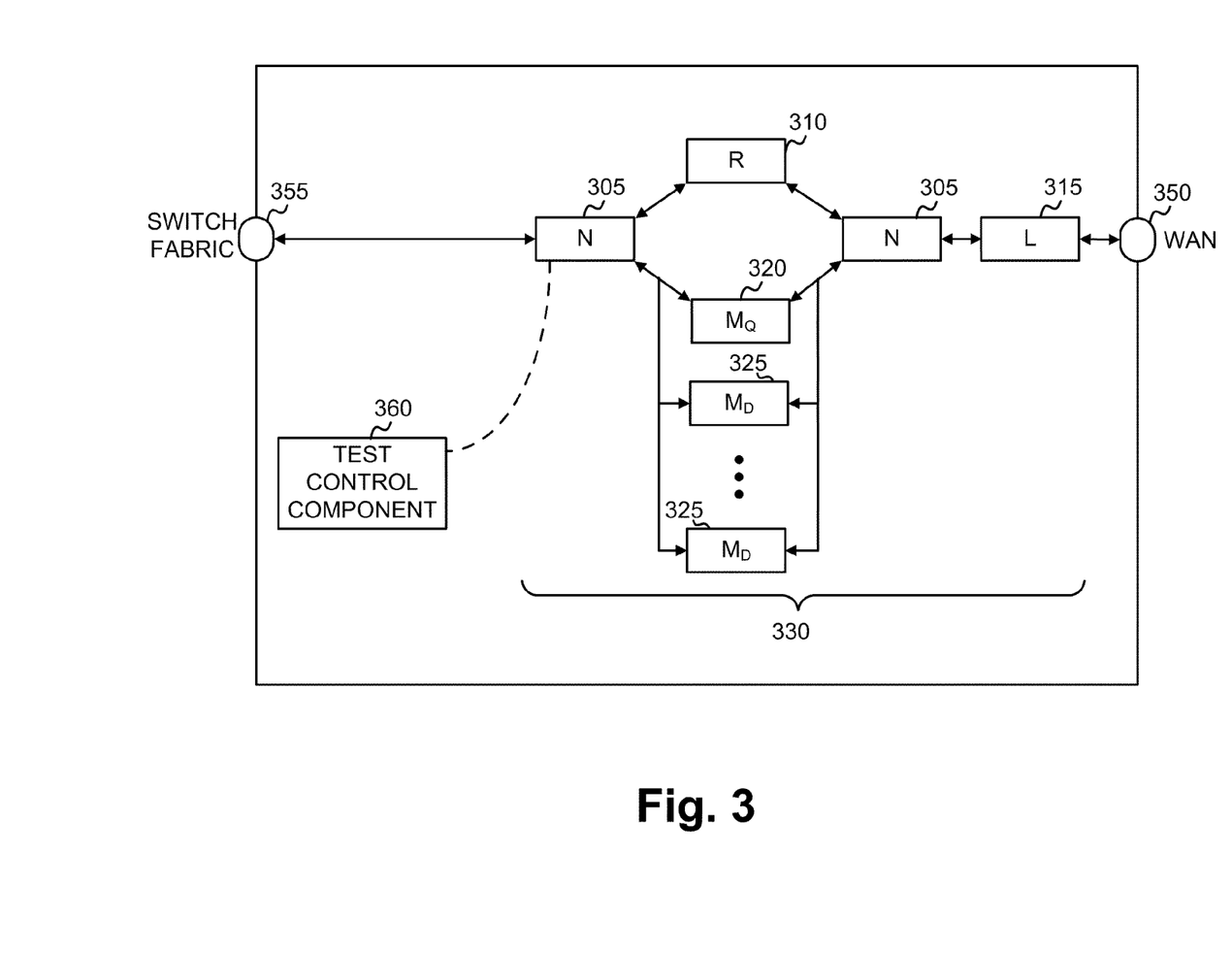
FIG. 3 is a diagram illustrating an exemplary implementation of a portion of a line card of a router.

FIG. 3 is a diagram illustrating an exemplary implementation of a portion of router 100. The components shown in FIG. 3 may be those that particularly relate to the forwarding plane of router 100 and may correspond to components in PFE 220. In general, functions of router 100 may be divided into a forwarding plane and a control plane. The forwarding plane of router 100 may include components designed to receive incoming packets, determine appropriate output port(s) for the packets, and transmit the packets on those ports. The control plane of router 100 may include logic to coordinate the operation of the forwarding plane and execute routing protocols for router 100.

As shown in FIG. 3, router 100 may include a number of forwarding plane components 330 and a control plane component (test control component 360). In one implementation, each of forwarding plane components 330 may be a semiconductor chip or set of chips designed to provide functions relating to the forwarding of packets through router 100. The forwarding plane components are labeled as N chips 305, R chip 310, L chip 315, $M_Q$ chip 320, and $M_D$ chips 325. Router 100 may include one or more ports 350 and 355. Ports 355 may connect router 100 to switch fabric 210 (e.g., as implemented by SFC 110) and ports 350 may connect line card 125 to an external WAN.

L chip 315 may connect to a port(s) 350. Packets incoming to router 100 may be received by L chip 315. Packets outgoing from router 100 may be output by L chip 315 to ports 350. From an input perspective, L chip 315 may generally operate to format incoming packets into a standardized format that is used by router 100. For example, L chip 315 may rearrange the header information for an incoming packet into a standardized representation that is internally used by router 100. For example, L chip 315 may, for example, remove SONET or Ethernet header information from an incoming packet, convert the SONET or Ethernet header information into a standardized format, and forward the packet to N chip 305. In the outgoing direction, L chip 315 may receive the header information as the standardized format header data and generate "normal" (i.e., industry standard protocol format) headers and output the packet with the normal headers.

N chips 305 may generally operate to process packets to separate control information, such as information in the headers of packets, from the packet payload data. The payload data may be stored in memory, such as memory included in one or more of $M_D$ chips 325. Header information may be sent to R chip 310 for processing. N chips 305 may additionally store information identifying each incoming packet, such as an index value corresponding to the packet, in $M_Q$ chip 320.

Two N chips are particularly shown in FIG. 3. One of N chips 305 may be coupled, through L chip 315, to ports 350 (the WAN-side N chip) and the other N chip 305 may be connected to ports 355 (the switch fabric side N chip).

R chip 310 may operate to process the header information received from N chips 305. R chip 310 may make the actual forwarding decisions for the packets. For example, R chip 310 may determine an output port for a packet. For routers implemented using multiple line cards, the determined output port may be part of the current line card or at another line card. When the determined output port is part of the current line card, the packet may be output from one of ports 350. When the determined output port is part of another line card, the packet may be output to one of ports 355 to switch fabric 210, where it may be switched to a line card that includes the destination output port.

$M_Q$ chip 320 may operate to store a pointer or other structure that is used to keep track of the packets as the packets are split into data units, stored in $M_D$ chips 325, and processed by R chip 310. $M_Q$ chip 320 may, for example, implement one or more queues that store identifiers associated with packets output from N chips 305. The identifier may include information describing locations in $M_D$ chips 325 at which the packets are stored.

$M_D$ chips 325 may generally operate to store data units that correspond to the payload data of the received packets. In some implementations, the payload data for a particular packet may be spread over multiple $M_D$ chips 325. Each $M_D$ chip 325 may include one or more sections of computer memory, such as high speed random access memory (RAM), which may store data units while R chip 310 processes the corresponding packet header.

In some implementations, $M_Q$ and $M_D$ chips 320 and 325 may both be physically implemented using identical RAMs. In this case, whether a particular chip is an $M_Q$ chip 320 or an $M_D$ chip may depend on the operational mode of the chip or on how the chip is used.

As previously mentioned, N chips 305, R chip 310, L chip 315, $M_Q$ chip 320, and $M_D$ chip 325 may operate in the forwarding plane of router 100, where the forwarding plane generally refers to the components that process packets traversing router 100. Router 100 may also include control plane components, such as test control component 360.

Test control component 360 may include one or more processors, micro-processors, application specific integrated circuits (ASICs), or other logic used for control and configuration of forwarding plane components 330. Test control component 360 may, for example, include connectivity to one or more of N chips 305 (shown as a dashed line in FIG. 3) and may be configured to inject data units into the forwarding plane through N chips 305 and receive and or analyze data or packets that are being processed in the forwarding plane.

FIG. 3 illustrates exemplary components of a PFE 220 of router 100. In other implementations, router 100 may include additional components, fewer components, different components, or differently arranged components than those illustrated in FIG. 3 and described herein. For example, although N chips 305, R chip 310, L chip 315, $M_Q$ chip 320, and $M_D$ chip 325 were described as "chips," it can be appreciated that these components may each be implemented by one or more semiconductor elements. For example, each chip may include multiple discreet semiconductor packages arranged on a printed circuit board. Further, although a single set of forwarding plane components 330 are illustrated in FIG. 3, such as forwarding plane components 330 of a single PFE 220, multiple sets of forwarding plane components 330 (i.e., multiple PFEs 220) may be implemented.

Figure 4:
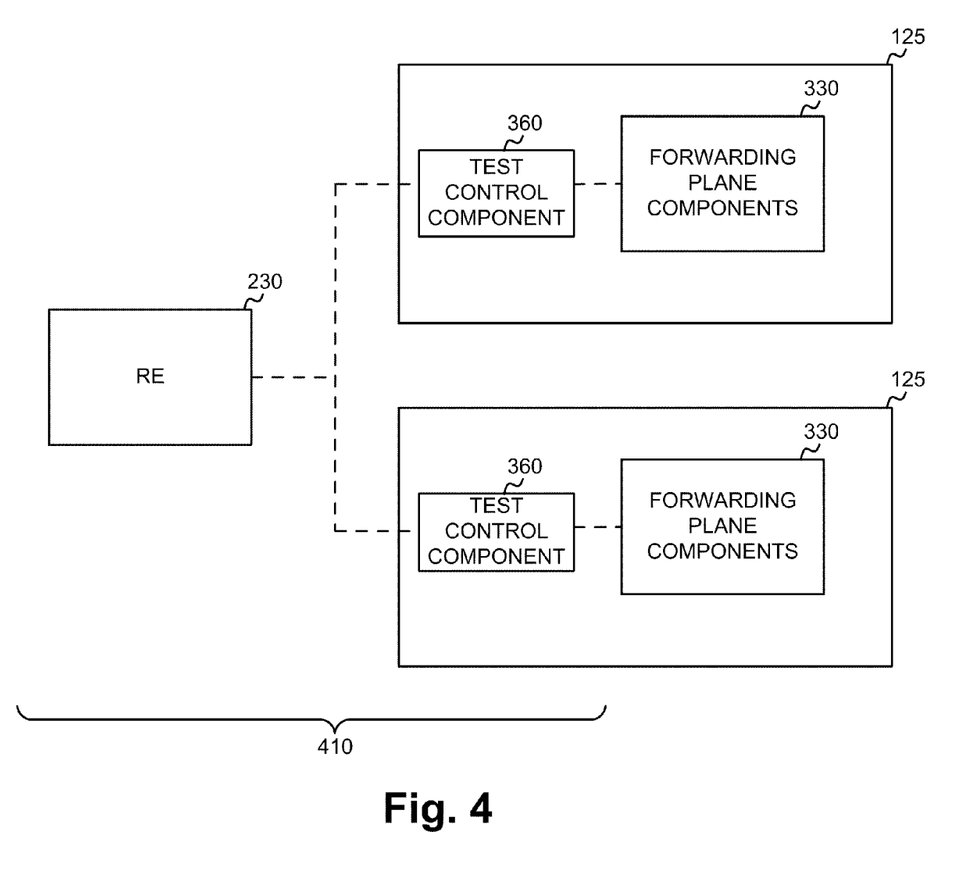
FIG. 4 is a diagram illustrating exemplary components of a router.

FIG. 4 is a diagram illustrating exemplary components of router 100. FIG. 4 may particularly illustrate portions of a control plane 410 of router 100.

Control plane 410 may include RE 230. RE 230 may control a number of line cards 125, such as a number of line cards 125 within LCC 120. RE 230 may be coupled to test control component 360 of each line card 125. RE 230 may include logic, such as hardware and/or software, to coordinate or control packet-based memory tests performed by test control components 360 and forwarding plane components 330.

Figure 5:
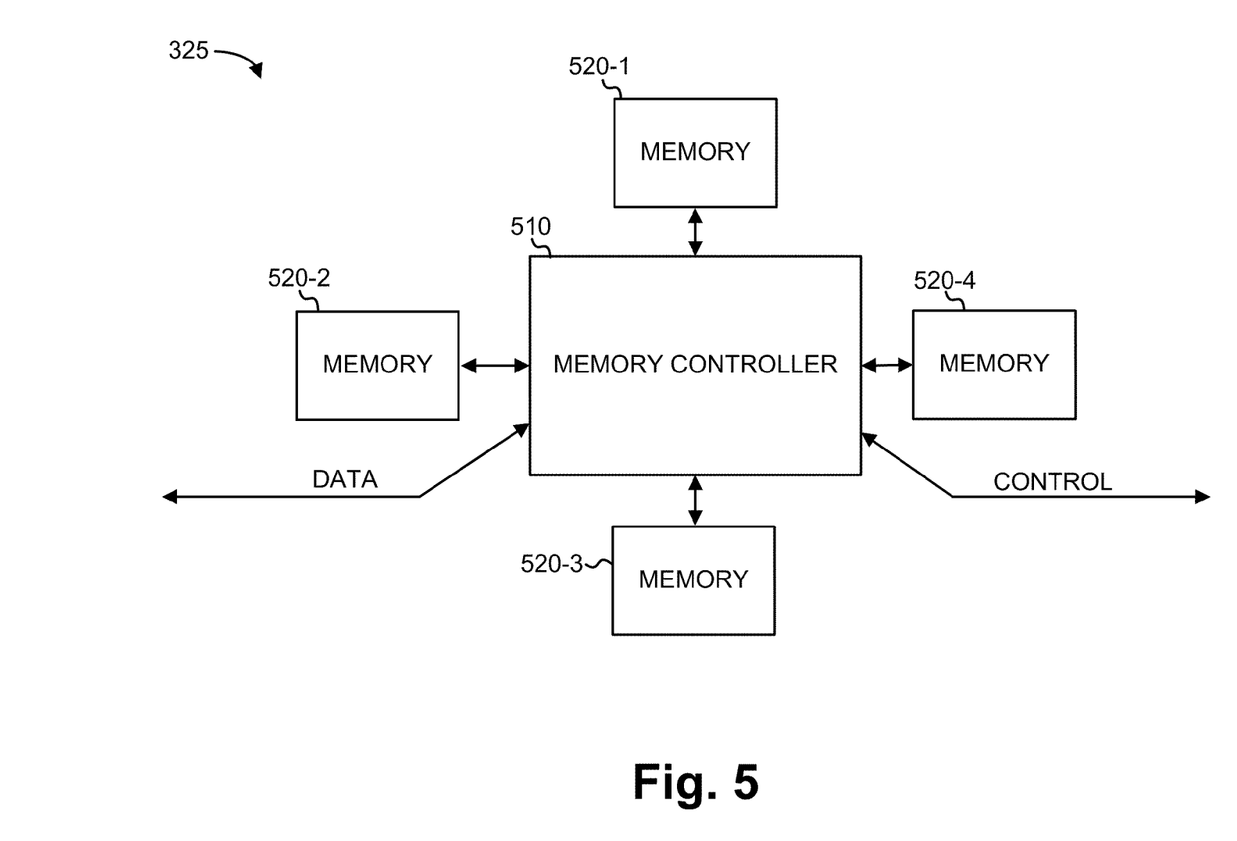
FIG. 5 is a diagram illustrating exemplary components in a memory of a router.

FIG. 5 is a diagram illustrating exemplary components in $M_D$ chip 325. $M_Q$ chip 320 may include similar components. $M_D$ chip 325 may include a memory controller 510 and memories 520-1 through 520-4. Memory controller 510 may operate to store data units in memories 520 while the headers corresponding to the data units are being processed by N chips 305 and R chip 310.

Memories 520 may each include computer-readable media such as, for example, high speed RAM. Although four memories 520-1 through 520-4 are shown connected to memory controller 510, in alternative implementations, greater or fewer than four memories could be connected to memory controller 510.

Memory controller 510 may include logic to receive incoming data (e.g., data units or portions of packets) and store the incoming data in memories 520. A data unit may be spread over multiple memories 520. Memory controller 510 may also receive requests for data units, read the corresponding data units from memories 520, and output the read data units. In one implementation, memory controller 510 may be implemented as an ASIC. Incoming packet data may be received by memory controller as part of the data forwarding plane of router 100, labeled as "DATA" path in FIG. 5.

In one implementation, memory controller 510 may include logic designed to test the low-level integrity of memories 520. For example, a circuit in memory controller 510 may be associated with each memory 520. During a testing procedure, such as a testing procedure initiated by test control component 360, memory controller 510 may write and read from each bit in memories 520 to test the low-level integrity of memories 520. Results of the tests of memories 520 may be read from memory controller 520, over the path labeled "CONTROL", by external devices, such as test control component 360 or RE 230.

In some situations, memory-related failures during processing operations of router 100 may be caused by factors other than the low-level memory failures. For example, under stress (i.e., high packet load), manufacturing errors in memory controller 510 may cause corrupt data to be read from memories 520. Errors of this type may not be detectable during low-level integrity test of memories 520 by memory controller 510.

Packet-Based Memory Test of Line Card

Figure 6:
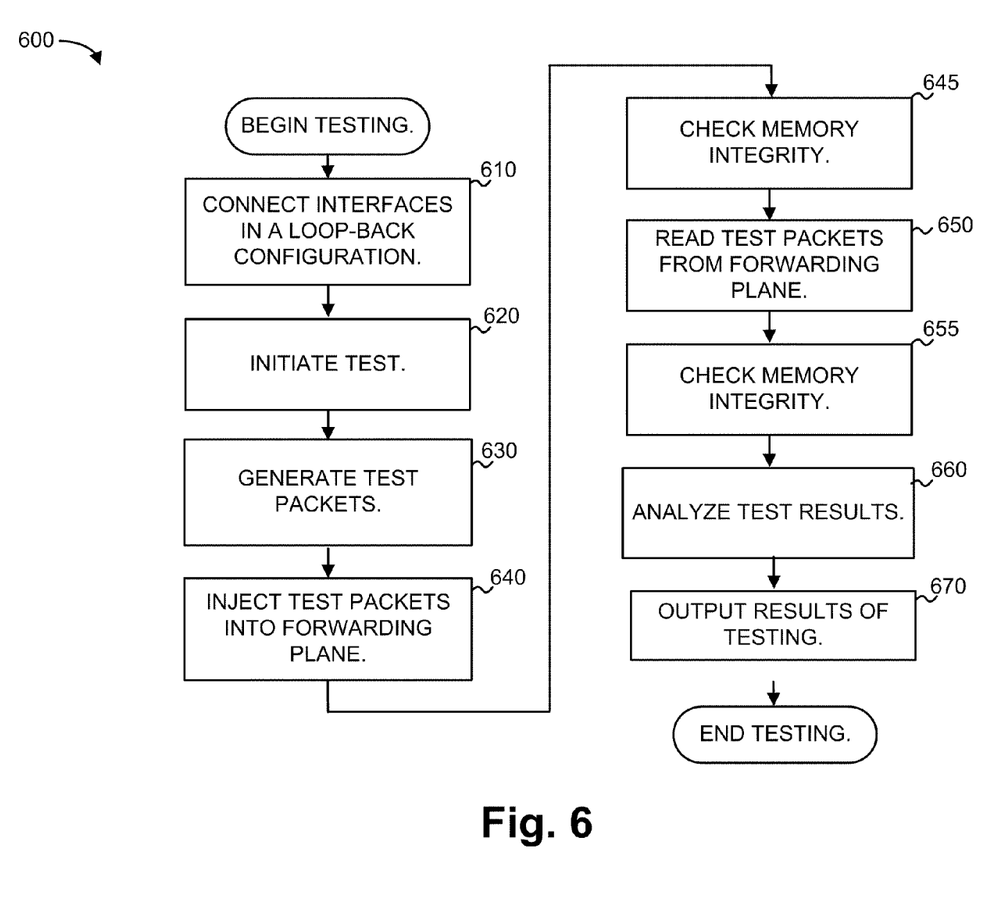
FIG. 6 is a flow chart illustrating an exemplary process for performing packet-based memory testing of a line card.

FIG. 6 is a flow chart illustrating an exemplary process 600 for performing packet-based memory testing. The memory test may be particularly designed to test the operation of $M_Q$ chips 320 and $M_D$ chips 325 under stress.

Process 600 may include connecting the interfaces relevant to the tested data path in a loop-back configuration (block 610). In the loop-back configuration, each outgoing data stream may be connected to be feed back to the corresponding incoming data stream. Each port of router 100 may include, for example, corresponding transmit stream and a receive stream. The transmit and receive streams for each port may be connected in a loop-back configuration. Physically, the loop-back configuration may be achieved by plugging two ends of a cable into slots in router 100. The cable may be, for instance, an optical cable, coaxial cable, or other type of cable that depends on the interface provided by the router. Alternatively, the loop-back implementation may be logically implemented, such as through switching done on L chip 315 and/or N chips 305. The loop-back configuration may cause packets output at one interface to be re-circulated back into the same line card or PFE. Typically, such a configuration may not normally be used during run-time operation of router 100.

Process 600 may further include initiating a packet-based memory test (block 620). The packet-based memory test may be initiated by test control component 360 or RE 230 in response to a signal from a user. For example, router 100 may include a diagnostic port through which a user can connect. A laptop, for example, may connect to router 100 via a serial interface or a USB interface. Through the laptop, the user may initiate a packet-based memory test.

Process 600 may further include generating test packets (block 630). The test packets may be generated by test control component 360 or RE 230 and may include packets in which the packet header and payload includes data patterns that are designed to test memories 520 and memory controller 510. The payload data pattern for a packet may include, for example, all one bits, all zero bits, alternating one and zero bits, etc. In an alternative implementation, test control component 360 may be designed to include one or more possible pre-stored test packets that may be used during testing. In this situation, "generating" packets may include reading the pre-stored packets from a memory.

Process 600 may further include injecting the generated test packets into the forwarding plane of router 100 (block 640). As illustrated in FIG. 3, test control component 360 may be coupled to N chip 305 in a way that allows test control component 360 to insert packets (or data units corresponding to the packets) into the forwarding plane of N chip 305. At this point, the injected packets may be processed as if the injected packets were "normal" packets received at ports 350 or 355. Test control component 360 may control the rate at which the packets are injected into the forwarding plane. Because router 100 may be configured in a loop-back configuration, packets injected into the forwarding plane may continuously circulate, which may allow test control component 360 to increase the total packet load in the forwarding plane to any desired level by controlling the number of injected packets.

Process 600 may further include checking the integrity of the memories, such as memories 520 (block 645). As previously mentioned, memory controller 510 may perform low-level tests of memories 520 and/or keep track of whether memory cells are correctly written and read from memories 520. Control component 360 may query memory controller 510, over the control path shown in FIG. 5, to determine the results of these memory tests. In this manner, control component 360 may determine whether an error occurs in the operation of memories 520.

At some point, the test packets in the forwarding plane may be read (block 650). For example, test control component 360, after injecting test packets into the forwarding plane, may allow the packets to circulate in the forwarding plane for a certain test period (e.g., ten seconds) before reading the packets being processed by N chip 305. Because of the loop-back configuration, the packets read by test control component 360 should match the injected test packets.

Process 600 may further include a second check of the integrity of the memories, such as memories 520 (block 655). More particularly, control component 360 may access memory controller 510 to determine whether memory errors were detected.

Process 600 may further include analyzing the test results (block 660). The analysis may generally include a comparison of the read packets to determine if each of the read packets corresponds to one of the injected test packets. The analysis may be performed by, for example, test control component 360 or RE 230. For instance, test control component 360 may compare the bit patterns originally present in the test packets to the bit patterns in the packets after circulation of the test packets in the forwarding plane. A difference in patterns may indicate a problem in the forwarding plane, such as a problem with $M_D$ chip 325. In some implementations, because the particular architecture of router 100 is known ahead of time, test control component 360 may be able to control the flow of injected test packets so that the particular $M_D$ chip 325 that will be used to store each test packet can be determined. In this manner, test control component 360 may be able to isolate the defective component, such as the defective $M_D$ chip 325 or a defective memory controller 510.

The analysis conducted in block 660 may additionally include analyzing the results of the memory integrity checks. Based on the memory integrity checks and the packet-level comparisons, control component 360 may be able to isolate whether detected errors are the result of errors in memory controller 510 or in memories 520. For example, if errors are detected in the packet comparisons but errors are not reported as part of the memory integrity checks, test control component 360 may determine that memory controller 510 is defective.

Process 600 may further include outputting the results of the testing performed in blocks 630-660 (block 670). For example, LCC 120 or line card 125 may include a diagnostic port through which a user can connect to test control component 360. A laptop, for example, may connect to LCC 120 via a serial interface or a USB interface. Through the laptop, the user may review results of the testing. For example, the user may view a list of any paths or components, such as a memory 520 or memory controller 510, in an $M_Q$ chip 320 or $M_D$ chip 325, that are discovered, during testing, to be defective. In response, the user may make changes to the components, such as manually replacing defective components.

In some implementations, blocks 630-660 may be repeated for different test data packets. For example, over a series of iterations, different packet patterns, paths through the forwarding plane, and different packet load levels may be tested. In one possible implementation, test packets may be generated based on the results of a previous test. For example, if a previous test indicates that one of a number of possible components may be defective, test control component 360 may generate additional test packets that are designed to isolate the potentially failing component.

Figure 7:
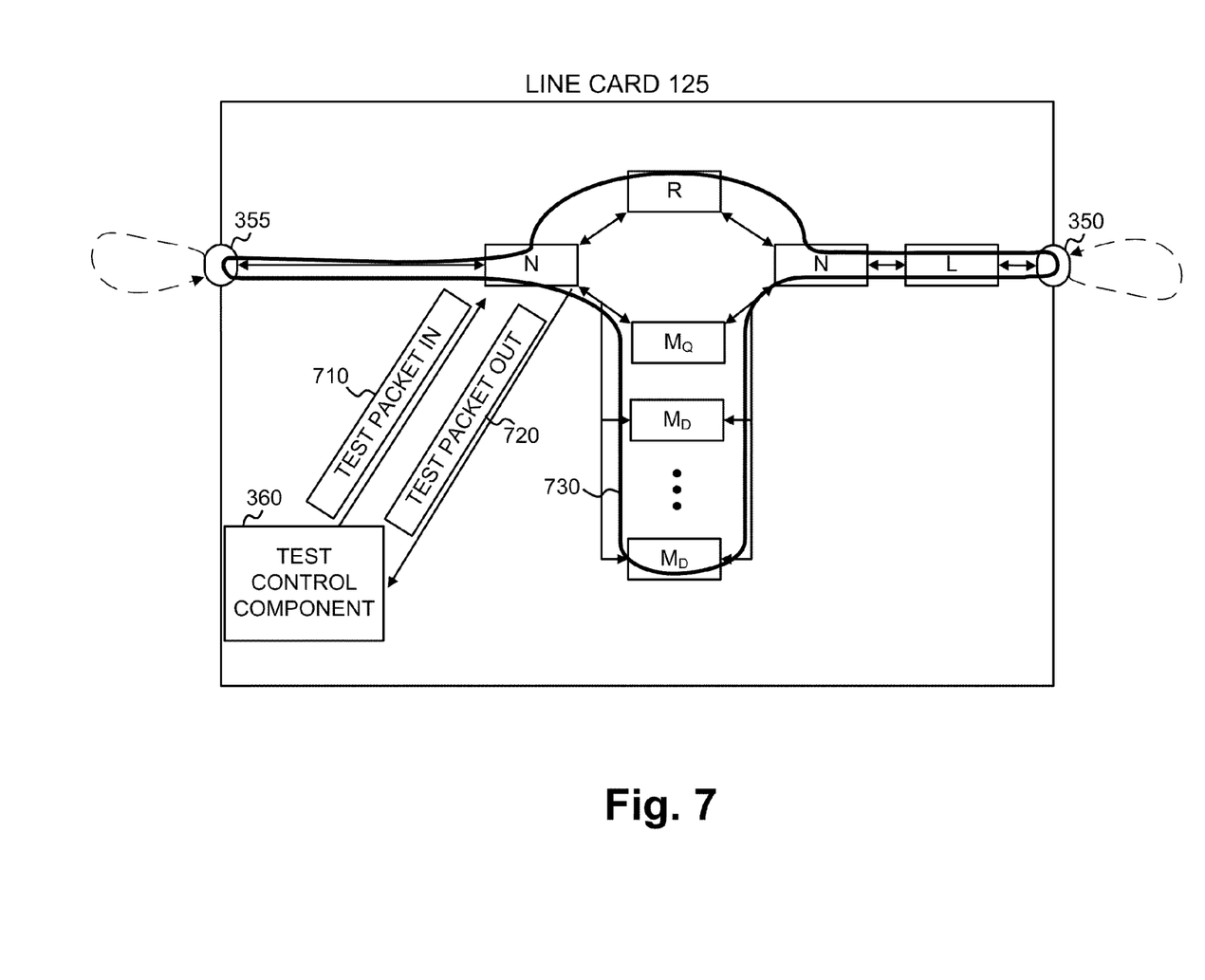
FIG. 7 is a diagram conceptually illustrating a packet-based memory test operation in a line card.

FIG. 7 is a diagram conceptually illustrating a packet-based memory test operation in a line card 125. Assume that the line card is being tested as part of the manufacture and assembly process of LCC 120. LCC 120 may be manufactured and line cards 125 inserted into LCC 120, but LCC 120 may not be fully connected as a complete router, such as router 100 (FIG. 1).

As illustrated, line card 125 may be connected in a loop-back configuration. For example, a user may manually connect both ends of a cable into two optical interfaces of line card 125. When testing is initiated, test control component 360 may generate and inject test packets ("test packet in" 710) into the forwarding plane. Due to the loop-back configuration of line card 125, the test packets may circulate in the forwarding plane, illustrated by curve 730. At some point, such as after passage of a predetermined test period, test control component 360 may sample one or more of the test packets ("test packet out" 720) from the forwarding plane. Test control component 360 may analyze the sampled test packets and memory tests performed by memory controller 510 to detect errors in the forwarding plane. By varying the content of the test packets and the number of circulating test packets in the forwarding plane, test control component 360 can provide a testing environment that simulates operational conditions in the forwarding plane under different load conditions.

Conclusion

As described above, a router testing technique is described in which a packet-based test of memory components in the router can be efficiently implemented. The test can be performed solely using components that are part of the router and do not require external router testing devices.

While a series of operations has been described with regard to FIG. 6, the order of the operations may be varied in other implementations consistent with the invention.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method including:
   generating, by a control plane of a network device, a first plurality of packets;
   inserting, by the control plane, the first plurality of packets into a forwarding plane of the network device,
      the forwarding plane being configured in a loop-back configuration;
   storing a portion of the first plurality of packets in memory components of the forwarding plane while circulating the first plurality of packets in the forwarding plane;
   receiving, by the control plane and after storing the portion of the first plurality of packets in the memory components, first test results from a memory controller associated with the memory components;
   receiving, by the control plane, a second plurality of packets from the forwarding plane;
   determining, by the control plane, second test results by comparing the second plurality of packets to the first plurality of packets;
   determining, by the control plane, information regarding the forwarding plane and the memory components based on the first test results and the second test results; and
   outputting, by the control plane, the information regarding the forwarding plane and the memory components.

2. The method of claim 1, where determining the second test results includes:
   comparing bit patterns of the second plurality of packets to bit patterns of the first plurality of packets, and
   determining the second test results based on the comparing,
      the second test results indicating whether errors exist in the memory components, and
      each of the memory components including one or more random access memories.

3. The method of claim 1, where inserting the first plurality of packets includes:
   inserting the first plurality of packets into the forwarding plane based on a desired packet load at which the memory components are to be tested.

4. The method of claim 1, where the network device includes a plurality of modular components.

5. The method of claim 1, where the first test results include indications of defective memory cells in the memory components.

6. The method of claim 1, where the outputting the information regarding the forwarding plane and the memory components includes:
   transmitting the information regarding the forwarding plane and the memory components to a computing device that is connected to a diagnostic port of the network device.

7. The method of claim 1, further comprising:
   generating additional packets based on at least one of the first test results or the second test results, and
   inserting the additional packets into the forwarding plane.

8. A device comprising:
a forwarding plane that includes a memory component; and
a control plane to:
generate a first plurality of packets, and
insert the first plurality of packets into the forwarding plane, the memory component being to:
store a portion of the first plurality of packets while the first plurality of packets are circulating in the forwarding plane, and
the control plane being further to:
receive, after the storing of the portion of the first plurality of packets, first test results from a memory controller associated with the memory component,
receive a second plurality of packets from the forwarding plane,
determine second test results by comparing the second plurality of packets to the first plurality of packets,
determine information regarding the forwarding plane and the memory component based on the first test results and the second test results, and
output the information regarding the forwarding plane and the memory component.

9. The device of claim 8, where the first test results indicate whether memory cells in the memory component are defective.

10. The device of claim 8, where the forwarding plane and the control plane include at least one line card of the device.

11. The device of claim 8,
where the forwarding plane is configured in a loop-back configuration, and
where the loop-back configuration connects outgoing data streams of the forwarding plane to corresponding incoming data streams of the forwarding plane.

12. The device of claim 8, where the forwarding plane is to:
separate header information of the first plurality of packets from payload data of the first plurality of packets, and p1 store the payload data in the memory component and one or more other memory components,
the portion of the first plurality of packets including the payload data.

13. The device of claim 8,
where the device includes a chassis that holds a plurality of line cards, each of the plurality of line cards including at least a portion of the forwarding plane and the control plane.

14. The device of claim 8, where, when inserting the first plurality of packets into the forwarding plane, the control plane is to:
insert the first plurality of packets into the forwarding plane based on a desired packet load at which the memory component is to be tested.

15. The device of claim 8, where the device includes a plurality of modular components.

16. A network device comprising: one or more processors to:
insert a first plurality of packets into a forwarding plane that includes one or more memory components,
the one or more memory components storing a portion of the first plurality of packets while the first plurality of packets are circulating in the forwarding plane;
receive, after the storing of the portion of the first plurality of packets, first test results from a memory controller associated with the one or more memory components;
read a second plurality of packets from the forwarding plane;
determine second test results by comparing the second plurality of packets to the first plurality of packets;
determine information regarding the forwarding plane and the one or more memory components based on the first test results and the second test results; and
output the information regarding the forwarding plane and the one or more memory components.

17. The network device of claim 16, where the first test results indicate whether memory cells of the one or more memory components are defective.

18. The network device of claim 16, where the one or more processors are further to:
separate header information of the first plurality of packets from payload data of the first plurality of packets, and
store the payload data in the one or more memory components,
the payload data including the portion of the first plurality of packets.

19. The network device of claim 16, where the network device includes a plurality of modular components.

20. The network device of claim 16, where, when inserting the first plurality of packets, the one or more processors are to:
insert the first plurality of packets into the forwarding plane based on a desired packet load at which the one or more memory components are to be tested.

21. A method comprising:
generating, by a network device, a first plurality of packets;
inserting, by the network device, the first plurality of packets into a forwarding plane of the network device,
the forwarding plane being configured in a loop-back configuration;
storing, by the network device, a portion of the first plurality of packets in memory components of the network device while circulating the first plurality of packets in the forwarding plane of the network device;
receiving, by the network device and after storing the portion of the first plurality of packets, first test results from a memory controller of the memory components;
reading, by the network device, a second plurality of packets from the forwarding plane;
determining, by the network device, second test results by comparing the second plurality of packets to the first plurality of packets;
determining, by the network device, information regarding the forwarding plane and the memory components based on the first test results and the second test results; and
outputting, by the network device, information regarding the forwarding plane and the memory components.

22. The method of claim 21, where the network device includes a plurality of modular components.

23. The method of claim 21, where inserting the first plurality of packets includes:
inserting a quantity of the first plurality of packets into the forwarding plane based on a desired packet load at which the memory components are to be tested.

24. The method of claim 21, where reading the second plurality of packets from the forwarding plane includes:
determining a passage of a particular time period, and
reading, after determining the passage of the particular time period, the second plurality of packets from the forwarding plane.

* * * * *